UNITED STATES PATENT OFFICE

GUY H. BUCHANAN, OF WESTFIELD, NEW JERSEY, ASSIGNOR TO AMERICAN CYANAMID COMPANY, OF NEW YORK, N. Y., A CORPORATION OF MAINE

INSECTICIDE AND FUMIGANT

No Drawing.    Application filed April 23, 1926. Serial No. 104,212.

This invention relates to the manufacture of cyanides, more particularly to high-grade cyanides of the alkali metals.

A large number of processes for the production of cyanides have been proposed and used but those processes which result in high-grade or substantially pure cyanides are relatively expensive. Among such methods may be mentioned the reaction between sodium ferrocyanide and metallic sodium, and the reaction between ammonia and metallic sodium to form sodamide, followed by reaction with carbon whereby sodium cyanide is formed. These processes are based upon expensive raw materials, and therefore, the products are not capable of competing with other lower grade products except in those instances where pure cyanides are essential.

A number of processes for producing cyanides of low grade involving the reaction between sodium carbonate, carbon and nitrogen in the presence of a catalyzing material, such as iron, have been described, but methods of this kind have not been successful commercially for the reason that the resulting product contains rather low percentages of sodium cyanide, the manufacture thereof is troublesome, and it is difficult to separate the cyanide in pure form from the reaction mass.

Another method which has been in use for some time and which has resulted in the production of enormous quantities of cyanides is the process of the patent to Walter S. Landis, No. 1,359,257, dated Nov. 16th, 1920. The process described and claimed makes use of the reaction between calcium cyanamid and carbon, whereby the cyanamid content of the material is transformed into cyanide. Ordinary, commercial, impure calcium cyanamid containing sufficient quantities of carbon, either combined or free, to transform the cyanamid into cyanide is mixed with a sufficient quantity of a flux, which is usually common salt, and the mixture is fused in an electric furnace to cause the cyanide-forming reaction to take place. Material containing from 50% to 60% equivalent sodium cyanide can be readily produced thereby at a comparatively low cost. Difficulties are encountered when the attempt is made to increase the cyanogen content of the product above the amount contained therein as it comes from the furnace, although numerous attempts have been made to produce pure cyanides from this impure material, such attempts involving the solution of the material and precipitation of the impurities and subsequent concentration of the cyanide solution, or involving the precipitation of the cyanide from the solution. All these methods failed to accomplish the desired result on a commercial basis for several reasons. Great difficulty was encountered in preventing decomposition or loss of cyanide in the solution, filtration and crystallization steps, the cost thereof was relatively high, the purification was difficult to carry out on a large scale, and the sodium cyanide could not be readily separated from the sodium chloride present by crystallization because these compounds have the same crystal form.

It is of course desirable to obtain a high-grade cyanide by a cheap process, such as that of Landis, and it is among the objects of the present invention to produce a high-grade cyanide from low-grade, cheap materials by a process which is simple, which involves but few steps and little manipulation and which is eminently adaptable for quantity production.

It is also among the objects of this invention to produce a material which has useful properties as a fumigant and insecticide.

In practicing my invention, I produce an impure cyanide such as that described by Landis, but instead of using sodium chloride as a flux, as set forth in the preferred examples of the operation of the Landis process, I use a class of materials some of the members of which have been disclosed in the Landis patent, having the property of forming an insoluble calcium salt with the calcium of the crude calcium cyanamid used. This fluxing material should be stable at the high temperatures reached in the electric furnace operation.

Broadly, my method consists in forming a cyanide by fusing a salt of cyanamid containing carbon, with a flux which is capable of forming an insoluble salt with the metal which is combined with the cyanamid, dissolving the product in water and substantially completely precipitating the said metal, either by the addition of another salt to the solution or by the use of an excess of the flux in the fusion or in the solution. In the production of an alkali metal cyanide, such as sodium cyanide, starting with crude calcium cyanamid, the new method consists essentially of three simple steps:

First, the fusion of calcium cyanamid with a sodium salt capable of forming an insoluble calcium salt, such as sodium fluoride, in an electric furnace to produce a material containing from about 50% to 60% equivalent sodium cyanide.

Second, the solution of this product in water to precipitate the calcium therein as the fluoride. If a quantity of sodium fluoride insufficient to provide enough fluorine to combine with all of the calcium was used in the fusion, there is added sufficient of a suitable sodium salt, such as sodium carbonate, to complete the precipitation. After filtration, a solution is obtained which is substantially free from sodium or other soluble salts other than the sodium cyanide.

Third, the recovery of the sodium cyanide from the solution by evaporation and crystallization.

The following is a specific example of the operation of my process to produce a high-grade sodium cyanide:

I made a mixture containing 70 lbs. of commercial sodium fluoride, 200 lbs. of crude calcium cyanamid and 3 lbs. of calcium carbide and brought the mixture to fusion in an electric furnace at a temperature of about 1450° C. The molten material was quickly chilled to a temperature below 400° C., and it contained approximately 55% equivalent sodium cyanide. The material was dissolved in water with vigorous agitation and solid sodium carbonate was added in sufficient amount to precipitate the soluble calcium salts present. It is not essential to add sodium carbonate in such amounts as to remove every trace of calcium, but it is desirable to add at least enough sodium carbonate to prevent the solution from darkening when heated. The solution was filtered in a suitable apparatus and the filtrate found to contain sodium cyanide with only small amounts of impurities. In order to obtain solid sodium cyanide from the solution, I evaporated the solution to complete dryness on a drum dryer. The product thus obtained contained about 90% sodium cyanide.

This process not only results in a high grade cyanide, but the product at an intermediate stage has properties which are of considerable commercial value. The cyanide produced by the fusion of calcium cyanamid with less than the quantity of sodium fluoride required to combine with all the calcium contains sodium cyanide, calcium cyanide and calcium fluoride. It has been established that calcium cyanide reacts readily with the moisture of the air to produce hydrocyanic acid and this property is utilized for fumigation for the destruction of insect and animal pests. In the case of my intermediate product, produced with sodium fluoride, only that amount of cyanide present, over and above the chemical equivalent of the flux, is liberated on exposure to the moisture of the air and the remainder is stable under such conditions. The calcium fluoride in the product has insecticidal value. Since my intermediate material is partially stable in moist air and partially unstable, and contains the insecticidal fluoride, it may be used as a fumigant and insecticide under conditions where slight instability toward moist air is desirable. For example, the material is especially useful in soil fumigation where the rapid evolution of hydrocyanic acid is not desired. It is also an excellent stomach poison, not only because of the stability of a portion of its cyanide content, but also because of its fluorine content. It is apparent that this material may be modified so as to combine at will the desired proportions of calcium cyanide which decomposes readily in air and sodium cyanide which is relatively stable, to provide a fumigant and insectide for use under varying conditions and for different purposes.

My invention results in the production of a high grade cyanide in a simple manner, involving only the fusion of calcium cyanamid with suitable flux and the precipitation of the calcium in the product from water solution. Since the sodium cyanide remaining in the solution is substantially pure, no difficulties are encountered in the recovery of the solid sodium cyanide therefrom.

In the specific example given above, I have indicated the use of a certain amount of sodium fluoride to produce a material containing about 55% equivalent sodium cyanide. Since sodium fluoride is a relatively expensive material, it is desirable to reduce the amount used and I find that I may use considerably less quantities of sodium fluoride in the fusion and, by using a higher temperature in the furnace, obtain a product containing considerably higher percentages of cyanide. If I so desire, I may use more sodium fluoride than is given in the example and in some cases it may be advisable to use a sufficient amount to provide enough fluorine to precipitate all of the calcium present. My invention is not limited to the use of sodium fluoride for the fusion as any salt or mixtures of salts of the alkali metals capable of forming insoluble calcium salts and being stable at the temperature of the reaction may be used. It is desirable to avoid the use of fluxes which contain oxygen in the composition thereof, such as sulphates, phosphates or silicates, as they are reduced in the electric furnace at the high temperatures attained, with the resultant loss of cyanide which is consumed in the reduction.

My invention does not depend upon the use of sodium carbonate for the precipitation of the remainder of the soluble calcium salts, as other salts, such as sodium sulphate, sodium fluo-silicate and the like will accomplish the same results. In the specific example of my process, I have described the solution of the furnace product in water and then the addition of solid sodium carbonate to precipitate the calcium salts still remaining in the solution. It is obvious that this procedure may be varied and I may first make a solution of the sodium carbonate or other salt and add the furnace product thereto, either in solid form, in solution or as a slurry. For the recovery of the sodium cyanide from the solution, I need not evaporate the solution to complete dryness, but I may, for example, evaporate the solution in a vacuum evaporator, obtaining by this procedure a crystalline sodium cyanide of high purity, the impurities in the solution remaining in the mother liquor. Ordinarily my method results in a product containing from 85% to 95% of sodium cyanide, but obviously I may obtain either greater or lesser amounts of cyanide, depending upon variations in the manipulation and purity of materials initially used. However, I have had no difficulty in obtaining a 95% sodium cyanide in the manner above described and I anticipate no difficulties in making as high as a 98% cyanide. I have found that cyanide made from a fluoride fusion as described above can be successfully extracted with liquid ammonia while that from chloride is very difficult to extract owing to the formation of a double compound of ammonia and calcium chloride. Consequently I may make pure alkali metal cyanides from the fluoride compounds in this way. In this case, of course, enough fluoride must be used to be equivalent to the total cyanide. These and other changes may be made in my invention without departing from the principles thereof, the scope of which is set forth in the claims appended hereto.

What I claim is:

1. A fumigant and insecticide comprising the reaction product obtained by the fusion of calcium cyanamid with carbon and a fluoride of an alkali metal.

2. A fumigant and insecticide comprising the reaction product of the fusion of calcium cyanamid with carbon and sodium fluoride.

In testimony whereof, I have hereunto subscribed my name this 21st day of April, 1926.

GUY H. BUCHANAN.